(12) United States Patent
Dany

(10) Patent No.: US 9,127,594 B2
(45) Date of Patent: Sep. 8, 2015

(54) SYSTEM AND METHOD FOR USE OF A GAS

(75) Inventor: Harald Dany, Köln (DE)

(73) Assignee: Atlas Copco Energas GmbH, Köln (DE)

( * ) Notice: Subject to any disclaimer, the term of this patent is extended or adjusted under 35 U.S.C. 154(b) by 1253 days.

(21) Appl. No.: 11/412,293

(22) Filed: Apr. 27, 2006

(65) Prior Publication Data
US 2007/0009369 A1    Jan. 11, 2007

(30) Foreign Application Priority Data
Jul. 11, 2005 (DE) .......................... 10 2005 032 556

(51) Int. Cl.
| F02C 1/02 | (2006.01) |
| --- | --- |
| B63J 99/00 | (2009.01) |
| F02C 3/22 | (2006.01) |
| F02C 7/22 | (2006.01) |
| F17C 5/06 | (2006.01) |
| F17C 9/04 | (2006.01) |

(52) U.S. Cl.
CPC . *F02C 1/02* (2013.01); *B63J 99/00* (2013.01); *F02C 3/22* (2013.01); *F02C 7/22* (2013.01); *F17C 5/06* (2013.01); *F17C 9/04* (2013.01); *B63J 2099/003* (2013.01); *F17C 2221/033* (2013.01); *F17C 2223/0161* (2013.01); *F17C 2223/033* (2013.01); *F17C 2223/043* (2013.01); *F17C 2225/0123* (2013.01); *F17C 2225/035* (2013.01); *F17C 2227/0164* (2013.01); *F17C 2227/0341* (2013.01); *F17C 2227/0362* (2013.01); *F17C 2227/0388* (2013.01); *F17C 2265/033* (2013.01); *F17C 2265/037* (2013.01); *F17C 2265/038* (2013.01); *F17C 2270/0105* (2013.01); *Y02T 70/5263* (2013.01)

(58) Field of Classification Search
CPC ....... B63J 99/00; B63J 2099/003; F02C 1/02; F02C 3/22; F02C 7/22; Y02T 70/5263; F17C 5/06; F17C 9/04; F17C 2221/033; F17C 2223/0161; F17C 2223/033; F17C 2223/043; F17C 2225/0123; F17C 2225/035; F17C 2227/0164; F17C 2227/0341; F17C 2227/0362; F17C 2227/0388; F17C 2265/033; F17C 2265/037
USPC ......... 60/39.461, 39.465, 728; 415/58.4, 144; 62/48.1; 417/313, 375, 377
See application file for complete search history.

(56) References Cited

U.S. PATENT DOCUMENTS

| 3,735,600 A | * | 5/1973 | Dowdell et al. | 62/619 |
| --- | --- | --- | --- | --- |
| 3,798,898 A | * | 3/1974 | Delahaye | 60/780 |
| 4,163,365 A | * | 8/1979 | Frutschi | 60/773 |
| 6,062,041 A | * | 5/2000 | Kikkawa et al. | 62/613 |

(Continued)

FOREIGN PATENT DOCUMENTS

EP    0 069 717    1/1983

*Primary Examiner* — Peter J Bertheaud
*Assistant Examiner* — Dnyanesh Kasture
(74) *Attorney, Agent, or Firm* — Collard & Roe, P.C.

(57) ABSTRACT

A system for compressing a cryogenic gas, particularly a hydrocarbon gas, has a compressor for compressing the gas and a line arrangement, which passes the gas to the intake side of the compressor and passes the compressed gas to a subsequent device for use. The line arrangement has a bypass and the compressed gas can be passed back to the intake side of the compressor via the bypass. An expander is disposed in the bypass, for re-cooling the gas that flows through the bypass. A method regulates a system for compressing a cryogenic gas, particularly a hydrocarbon gas that occurs during storage of a cryogenic liquid.

8 Claims, 1 Drawing Sheet

(56) References Cited

U.S. PATENT DOCUMENTS

| | | | |
|---|---|---|---|
| 6,161,386 A * | 12/2000 | Lokhandwala | 60/649 |
| 6,453,659 B1 * | 9/2002 | Van Liere et al. | 60/39.53 |
| 6,460,350 B2 * | 10/2002 | Johnson et al. | 62/48.1 |
| 6,530,241 B2 * | 3/2003 | Pozivil | 62/619 |
| 6,546,748 B1 * | 4/2003 | Kelly et al. | 62/654 |

* cited by examiner

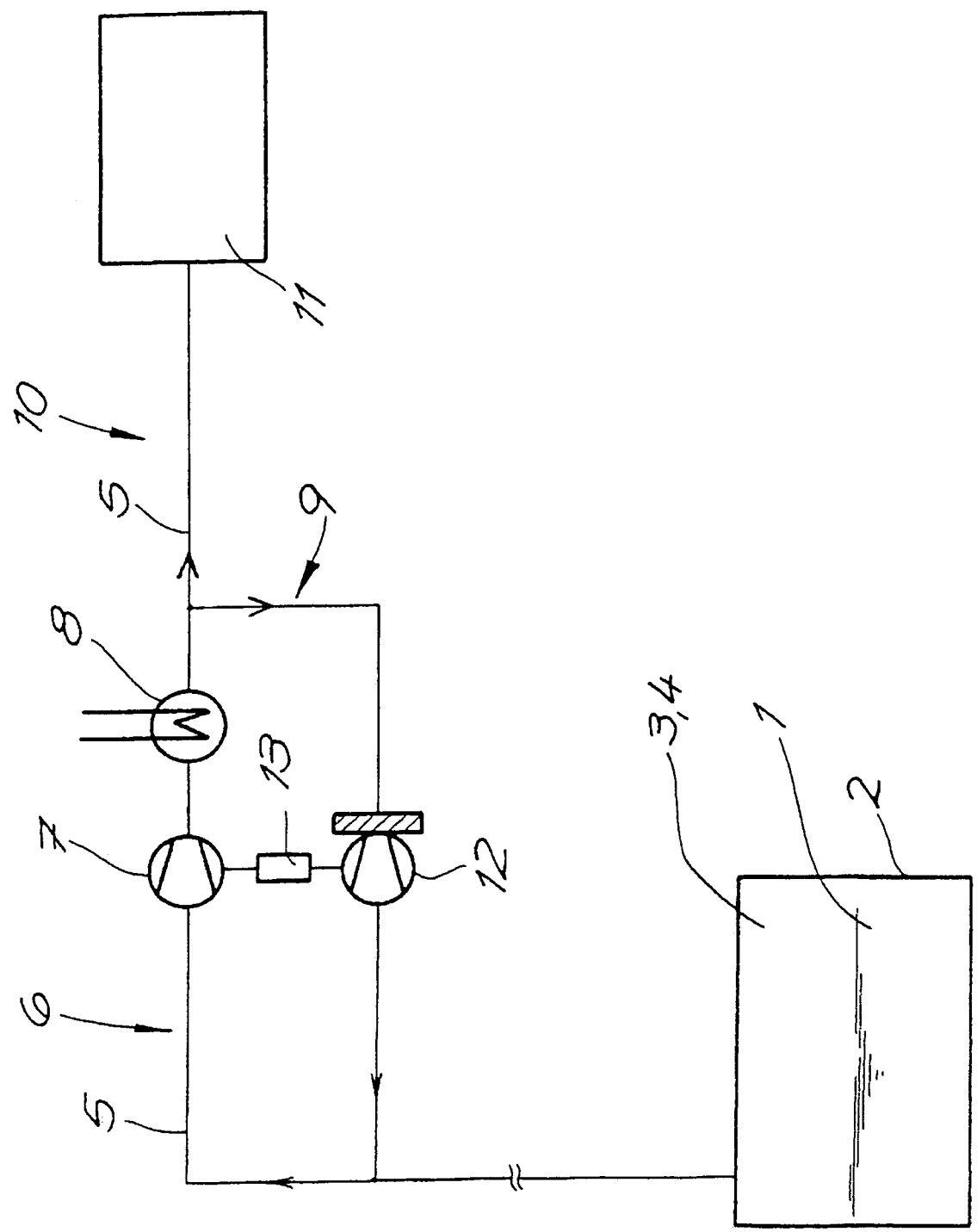

SYSTEM AND METHOD FOR USE OF A GAS

CROSS REFERENCE TO RELATED APPLICATIONS

Applicant claims priority under 35 U.S.C. §119 of German Application No. 10 2005 032 556.4 filed Jul. 11, 2005.

BACKGROUND OF THE INVENTION

1. Field of the Invention

The present invention relates to a system or apparatus for compressing a cryogenic gas, particularly a hydrocarbon gas, having a compressor for compressing the gas and a line arrangement. The line arrangement passes the gas to the intake side of the compressor and passes the compressed gas to a subsequent device. The gas occurs, for example, when a cryogenic liquid is stored in a supply tank.

2. The Prior Art

A system having the characteristics described is known from EP 0 069 717 B1. The cooled liquid natural gas is stored in a supply tank, at approximately atmospheric pressure, in a tank ship for the transport of liquid natural gas (LNG). The natural gas that evaporates within the tank is passed to an electrically operated compressor by way of a gas line, subsequently cooled, and passed into a gas tank for intermediate storage. The gas, which has been compressed to about 200 bar, is passed from the gas tank to a dual fuel diesel machine, which is designed for the combustion of gas and oil, and drives the tank ship. Both the load at the dual fuel diesel machine and the amount of the gas evaporating in the supply tank can be subject to great variations. As a result, pressure containers for intermediate storage of the compressed gas are necessary.

SUMMARY OF THE INVENTION

It is an object of the invention to provide a system or apparatus for compressing a cryogenic gas, with which the amount of gas passed to a subsequent device can be flexibly regulated in simple manner and with an acceptable degree of effect in terms of energy.

These and other objects are achieved, according to one aspect of the invention, by providing a system having the characteristics described initially with a line arrangement having a bypass by means of which the compressed gas can be passed back to the intake side of the compressor, and an expander disposed in the bypass, for re-cooling the gas that flows through the bypass. To a particular degree, a turboexpander formed as a flow machine is suitable as an expander. Although the gas is heated during compression, the compressor can be designed for low intake temperatures because of the re-cooling of the gas that flows through the bypass. This feature has an advantageous effect on the power requirement, the weight, and the space requirement of the compressor. The system according to the invention can be used both in stationary and in mobile manner, for example on a tank ship that transports liquid hydrocarbons such as liquid natural gas (LNG), for example.

In a preferred embodiment of the invention, the line arrangement has a cooler on the pressure side of the compressor. The compressed gas can be cooled down via the cooler to a temperature that is higher than the temperature of the gas passed to the intake side of the compressor. The bypass is connected to the line arrangement behind the cooler in the flow direction. The temperature difference that is achieved during expansion of the gas in the expander is essentially dependent on the pressure difference between pressure side and intake side. By reducing the gas temperature on the pressure side via the cooler, the temperature after expansion of the gas that flows through the bypass can therefore also be reduced.

The compressor and the expander can be mechanically coupled. Such mechanical coupling, for example by means of a mechanical gear mechanism or a common drive shaft, is particularly easy to implement if the expander is configured as a turboexpander. By means of the mechanical coupling, the energy required for compression can be compensated by means of the energy that is released at the expander, at least in part.

In a preferred embodiment of the invention, cooling of the gas stream to a temperature of less than −30° C., preferably to a temperature between −140° C. and −80° C., takes place in an expander. With this configuration, a great proportion of the gas or also the entire gas may be passed through the bypass in a closed circulation, without leaving the range of low temperatures for which the compressor is designed.

Preferably, the pressure in the line arrangement on the pressure side of the compressor is between 6 and 50 bar.

The cryogenic gas can occur, for example, due to the evaporation of a liquid stored in a supply tank. In this case, the cryogenic liquid is present in the supply tank at approximately atmospheric pressure. With this embodiment, the supply tank, which can be composed of several tank batteries, does not have to be designed as a pressure container, and therefore can be produced in cost-effective manner.

In another aspect of the invention, a method for regulating a system for compressing a cryogenic gas, particularly a hydrocarbon gas that occurs during storage of a cryogenic liquid is provided. In accordance with the method, the cryogenic gas is passed to a compressor at a temperature of less than −30° C., and compressed to a pressure of 6 to 50 bar via the compressor, for further use. At least part of the compressed gas is passed back to the intake side of the compressor and cooled via an expander during this process.

Preferably, the gas is introduced into the line arrangement at a temperature between −140° C. and −80° C., on the intake side, whereby the gas stream that is passed through the expander, which is preferably configured as a turboexpander, is cooled down to a temperature of less than −50° C. In this connection, the gas that flows through the expander can also be cooled to a temperature that essentially corresponds to or is less than the temperature of the gas introduced into the line arrangement on the intake side.

Within the scope of the method, the expander and the compressor can be mechanically coupled, whereby in particular, expanders and compressors structured as flow machines are suitable for simple mechanical coupling with a common gear mechanism or a common drive shaft. In a preferred embodiment of the method, the compressed gas is cooled to a temperature between 10° C. and 80° C. for further use, whereby part of the compressed and cooled gas is passed back to the intake side of the compressor as a bypass stream, and further cooled down by means of the expander.

The compressed gas can be used, within the scope of the method according to the invention, for operation of a gas turbine or an internal combustion engine. A greater or lesser bypass stream may be passed back to the intake side of the compressor as a function of the gas required for operation of the gas turbine or the internal combustion engine and cooled via the expander during this process.

The gas stream cooled down in the expander can be used for cooling the intake side of the system. If, for example, the surroundings of the supply tank in which the gas occurs due to evaporation of the cryogenic liquid are pre-cooled via the cooled gas stream, the power consumption of a cooling system provided for cooling the supply tank can be reduced.

BRIEF DESCRIPTION OF THE DRAWING

Other objects and features of the present invention will become apparent from the following detailed description considered in connection with the accompanying drawing. It should be understood, however, that the drawing is designed for the purpose of illustration only and not as a definition of the limits of the invention.

In the drawing:

The sole FIGURE shows a system according to the invention for the use of natural gas that occurs during the storage of cooled liquid natural gas (LNG) by means of evaporation, as a fuel for a gas engine or for use in a turbine.

DETAILED DESCRIPTION OF PREFERRED EMBODIMENTS

Turning now in detail to the drawing, liquid cooled natural gas is stored in a supply tank 2 at approximately atmospheric pressure, at a temperature of −163° C., as a cryogenic liquid 1. Evaporated gas 4 at a temperature of −140° C. collects in the gas space 3 of the supply tank, which gas is continuously passed to the intake side 6 of a compressor 7 from supply tank 2, by means of a line arrangement 5. In compressor 7, which is configured as a single-stage or multi-stage turbocompressor, gas 4 is compressed to a pressure of 26 bar, whereby the gas temperature increases to over +100° C. After compression, gas 4 is passed to a cooler 8, in which gas 4 is cooled to a temperature of approximately +35° C.

Behind cooler 8, a bypass 9 is connected to line arrangement 5. Part of the compressed gas 4 is passed back from pressure side 10 to intake side 6 of compressor 7, by means of bypass 9. The other part of gas 4 is passed to a device 11 for energy use, for example a gas engine or a gas turbine. An expander 12, which is configured as a turboexpander, is disposed in bypass 9 for re-cooling gas 4 that flows through bypass 9. Expander 12 is mechanically coupled with compressor 7 by way of a gear mechanism 13, causing part of the energy required for compression to be compensated with the energy released during expansion. The temperature of gas 4 cooled down in expander 12, at −100° C., approximately corresponds to the temperature at which gas 4 is drawn off from supply tank 2. The gas stream cooled down in expander 12 can also be used for pre-cooling supply tank 2. A greater or lesser bypass stream is passed back to intake side 6 of compressor 7, as a function of the gas required for operation of gas turbine 11, and cooled by means of expander 12 during this process, whereby the entire gas 4 can also be passed back from pressure side 10 to intake side 6 by means of the bypass 9, by way of expander 12.

Accordingly, although only at least one embodiment of the present invention has been shown and described, it is to be understood that many changes and modifications may be made thereunto without departing from the spirit and scope of the invention as defined in the appended claims.

What is claimed is:

1. A method for regulating a system comprising a supply tank and an apparatus that compresses a cryogenic gas that occurs during storage of a cryogenic liquid contained in the supply tank comprising the steps of:
   (a) passing the cryogenic gas to a compressor at a temperature of less than −30° C.; and
   (b) compressing the gas via the compressor to a compressed gas at a pressure of 6 to 50 bar for further use;
   wherein at least part of the compressed gas is passed back to an intake side of the compressor and cooled via an expander, and wherein the compressed gas is, after leaving a last compressor stage, cooled to a temperature between 10° C. and 80° C. without being liquefied and part of the cooled compressed gas is, without further compression, passed back as a bypass stream to the intake side of the compressor and further cooled down via the expander without being liquefied.

2. The method according to claim 1, wherein the gas is a hydrocarbon gas.

3. The method according to claim 1, wherein the gas is introduced into a line arrangement at a temperature between −140° C. and −80° C., on the intake side and the gas passed through the expander is cooled to a temperature of less than −50° C.

4. The method according to claim 1, wherein the expander and the compressor are mechanically coupled.

5. The method according to claim 1, wherein the cryogenic liquid is stored in a supply tank and the cryogenic gas occurs due to evaporation of the cryogenic liquid.

6. The method according to claim 1, wherein the compressed gas is used for operation of a gas turbine or an internal combustion engine and a greater or lesser bypass stream is passed back to the intake side of the compressor as a function of the gas required for operation of the gas turbine or the internal combustion engine, the bypass stream being cooled via the expander.

7. The method according to claim 1, wherein the gas cooled in the expander is used to cool the intake side of the system.

8. The method according to claim 1, wherein the cryogenic liquid is stored at approximately atmospheric pressure.

* * * * *